J. M. HIBNER.
TIRE CEMENTING MACHINE.
APPLICATION FILED NOV. 28, 1914.

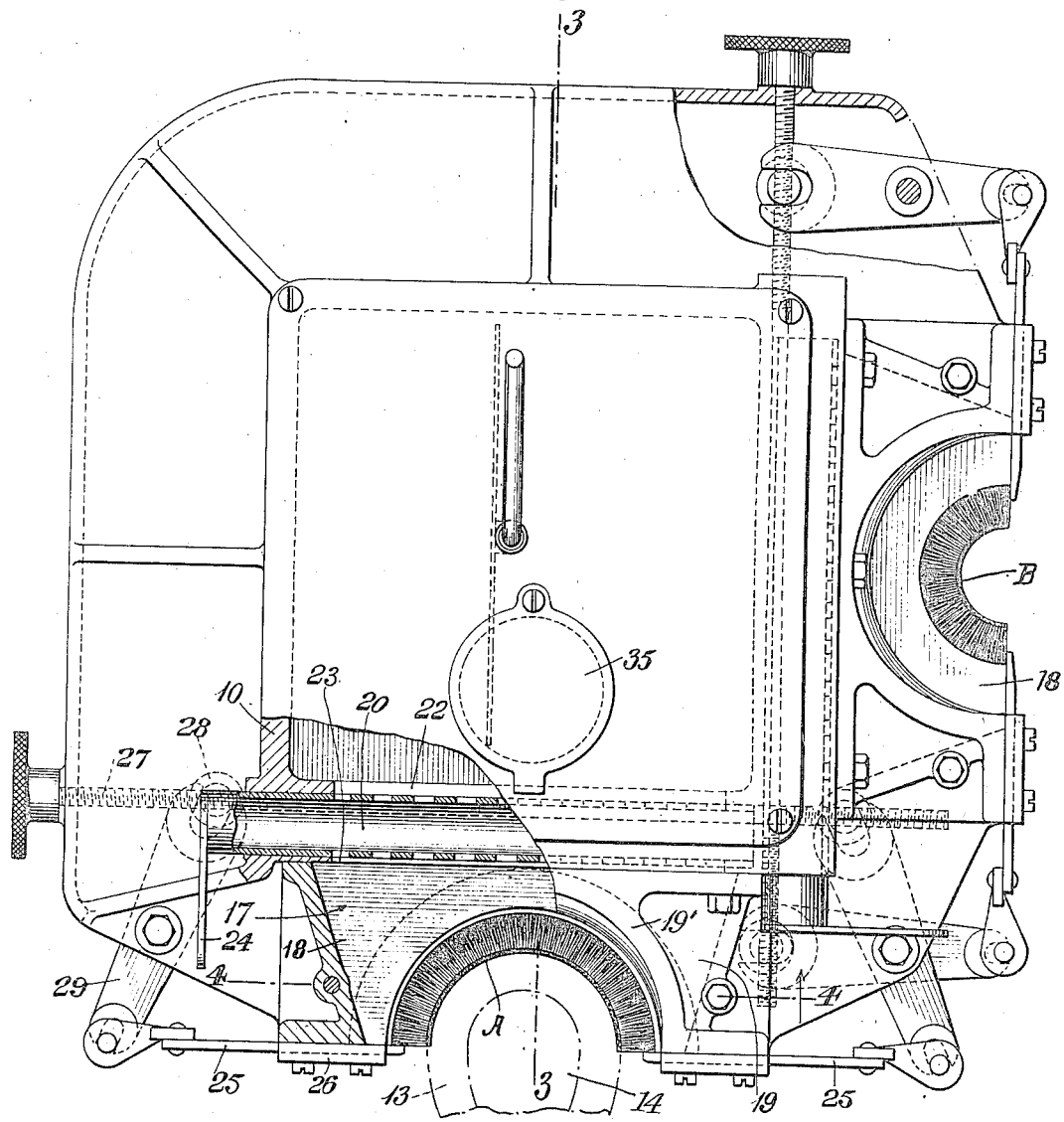
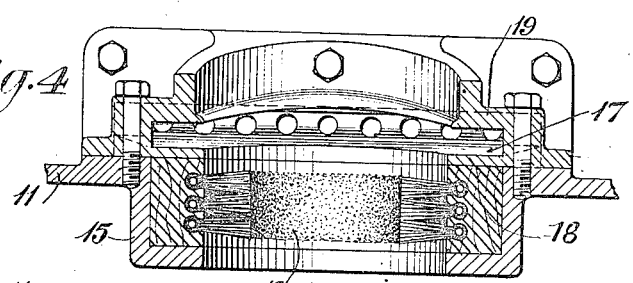

1,205,203.

Patented Nov. 21, 1916.
2 SHEETS—SHEET 2.

Witnesses:
Raphael Netter
Francis Boyle

Inventor
John M. Hibner
By his Attorney
Ernest Hopkinson

UNITED STATES PATENT OFFICE.

JOHN M. HIBNER, OF DETROIT, MICHIGAN, ASSIGNOR TO MORGAN & WRIGHT, A CORPORATION OF MICHIGAN.

TIRE-CEMENTING MACHINE.

1,205,203.      Specification of Letters Patent.      Patented Nov. 21, 1916.

Application filed November 28, 1914.   Serial No. 874,376.

*To all whom it may concern:*

Be it known that I, JOHN M. HIBNER, a citizen of the United States, residing at Detroit, county of Wayne, and State of Michigan, have invented certain new and useful Improvements in Tire-Cementing Machines, of which the following is a full, clear, and exact description.

This invention relates to tire building machines and has for an object to provide a machine for economically applying a uniform coat of cement to a tire carcass prior to the application of the tread thereto.

In the manufacture of tires the carcass is customarily built of plies of rubber treated fabric applied successively upon a revolving ring core. The surface of the built carcass is then buffed or roughened to receive a coat of cement which is usually manually applied with a brush. The separately built tread is then placed in position upon the carcass and is united therewith by the cement. The manual cementing of the carcass is objectionable because of the difficulty experienced in applying the cement uniformly to the carcass, and is also wasteful with respect to both the material and time of the operator.

The present invention provides a machine which obviates this hand operation of cementing a tire carcass and facilitates the application of a uniform coat of cement to the carcass with minimum manual attention and material.

Figure 2:
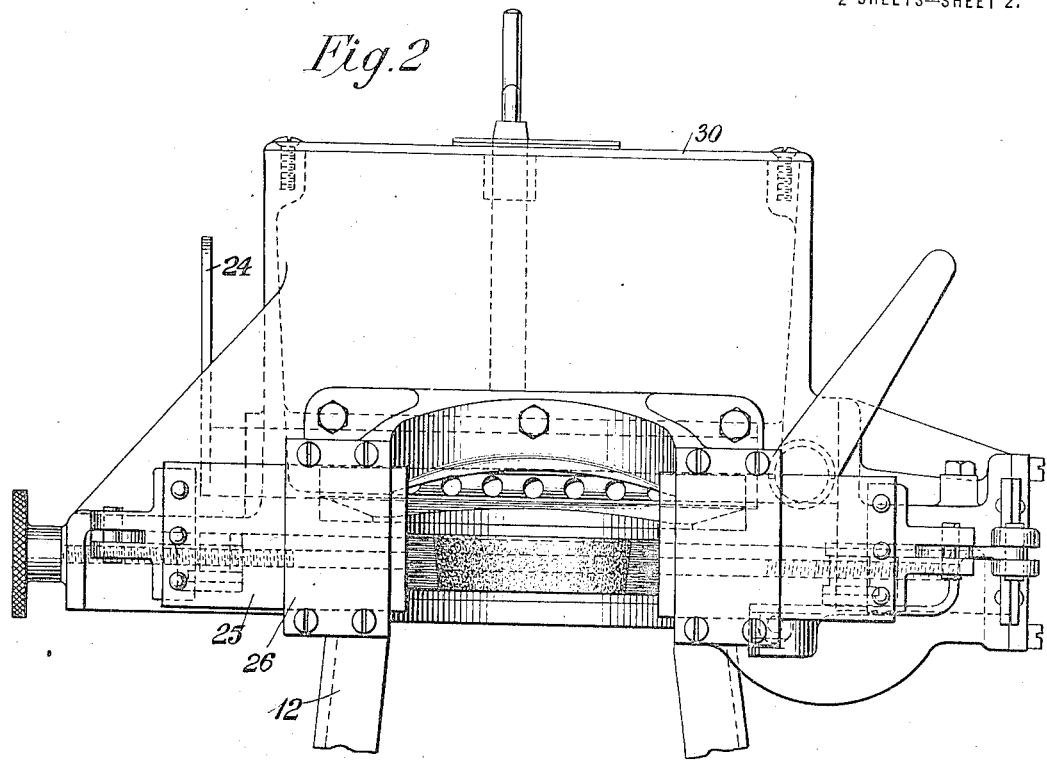
Figure 3:
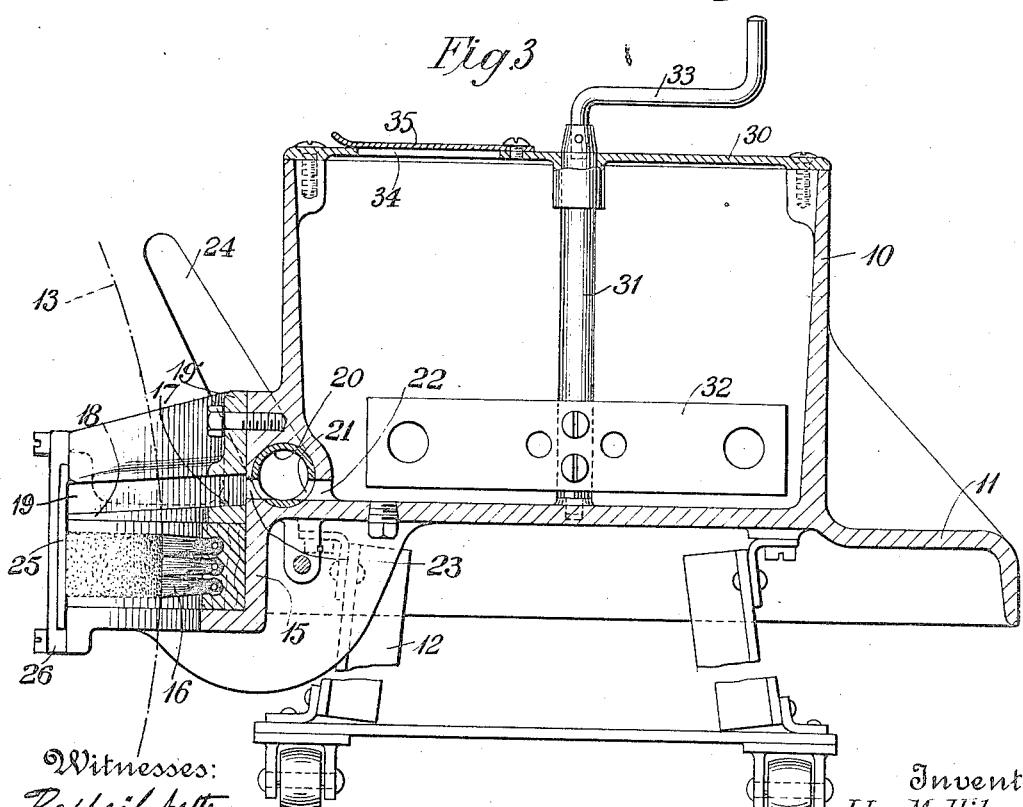

The invention will be readily understood from the following description in connection with the accompanying drawing, in which:

Figure 1 is a plan view of the machine with a portion broken away; Fig. 2 is a side elevation of the machine; Fig. 3 is a cross-sectional view on the line 3—3, Fig. 1; Fig. 4 is a cross-sectional view on the line 4—4, Fig. 1.

The machine comprises a substantially rectangular reservoir 10 for the cement, the reservoir being provided marginally at the bottom with an outstanding flange 11, and being supported upon caster equipped legs 12 of such height as to position the flange substantially in the plane of the axis of a tire carcass 13 supported upon its ring core 14.

The flange is formed at one or more sides of the reservoir with an arcuate chamber 15 to receive the carcass, and within the chamber is mounted an arcuate brush 16 of sufficient size to snugly embrace the crown of the carcass horizontally. Various sizes of brushes, as shown at A and B may be mounted on the flange to accommodate the various sizes of tire carcasses to be cemented.

Disposed above the brush is a trough 17 which is open at the front and conforms to the outline of and terminates in rear of the bristles of the brush, so that the brush may operate without obstruction upon the carcass. The trough is formed in a single-piece and embodies a forwardly tapered base 18, and a recessed cover 19 which has an upstanding flange 19' at the front edge to receive the overflow as will presently appear.

The flow of cement from the reservoir to the trough is controlled by a valve 20 which communicates through openings 21 with a slot 22 formed in the reservoir and opening into the back of the trough as shown at 23. The valve is equipped at one end with a handle lever 24 by means of which it may be rotated to establish or cut off communication between the reservoir and trough as desired.

At the ends of the arcuate brush 16 are located thin plates 25, which are carried in guides 26 bolted to the cover 19 and brush chamber as shown. These plates are operated simultaneously in opposite directions to abut and withdraw from the carcass through the instrumentality of a feed screw 27 that carries cylindrical nuts 28 which operatively engage respective rock levers 29, these levers being in turn operatively connected at the outer ends of their respective plates 25. Actuation of the feed screw serves to dispose the plates in abutting contact with the sides of the carcass whereby they co-act with the trough and with the surface of the carcass in producing a hopper for the brush in which the cement accumulates in a thick puddle upon opening of the valve 20.

The reservoir is closed at the top by a cover 30 in which is journaled a shaft 31 that is equipped within the reservoir with an agitator blade 32 and is equipped above the cover with a crank-handle 33 by means of which the operator may rotate the blade to keep the cement stirred while the machine is being used. An opening 34 is formed in the cover to allow the supply of cement to be replenished and is closed by a movable cap 35.

In operation the machine is moved up to the carcass and the brush disposed astride of the crown of the carcass. Next the slide plates 25 are moved to abut the sides of the tire. The valve 20 is then opened and the cement allowed to flow from the reservoir into the hopper where it accumulates in a thick puddle up above the brush. When the surface of the puddle is approximately even with the base of the cover flange 19', the operator closes the valve. Any overflow accumulates between the flange 19' and plates 25. The ring core with the carcass thereon is then rotated in a direction downward past the brush, the carcass carrying a film of the cement on its surface past the brush which smooths it uniformly and evenly over the crown of the carcass. After a few turns of the carcass the supply of cement in the trough will have been exhausted whereupon the plates 25 may be released and the machine withdrawn from the tire. It will thus be seen that a measured quantity of cement is applied to each carcass without waste, and that the cementing operation is accomplished in minimum time and with minimum manual attention, and furthermore, that the cement is applied in an even uniform coat to the carcass.

From the above description, the construction and operation of the invention will be easily seen, it being understood that the machine is applicable to cementing tire treads as well as carcasses, and it being further understood that various changes in the details of construction may be resorted to, such as, for instance, disposing the trough below the brush, or even feeding the cement through the brush, without departing from the spirit, or sacrificing any of the advantages of the invention.

What I claim and desire to protect by Letters Patent is:

1. A tire carcass cementing machine embodying a reservoir for cement, a brush adapted to transversely embrace the crown of a tire carcass, means adapted to coact with the surface of the carcass in forming a cement hopper for the brush, and means for supplying cement from the reservoir to the hopper.

2. A tire carcass cementing machine embodying a reservoir for cement, a trough adapted to straddle a tire carcass, a brush adapted to snugly embrace the carcass, means adapted to coact with the trough and with the surface of the carcass in forming a hopper for the brush, and means for supplying cement from the reservoir to the hopper.

3. A tire carcass cementing machine embodying a reservoir for cement, a trough adapted to straddle a revoluble carcass, a brush below the trough adapted to snugly embrace the carcass, stops on the trough at the ends of the brush adapted to contact with the sides of the carcass and coact with the trough and with the surface of the carcass in forming a hopper for the brush, and means for supplying cement from the reservoir to the hopper.

4. A tire carcass cementing machine embodying a reservoir for cement, a trough adapted to straddle a revoluble carcass, a brush below the trough adapted to snugly embrace the carcass, movable stops on the trough in advance of the brush adapted to abut the sides of the carcass and coact with the trough and with the surface of the carcass in forming a hopper for the brush, means for moving said stops to abut and withdraw from the carcass, and means for supplying cement from the reservoir to the hopper.

5. A tire carcass cementing machine embodying a reservoir for cement, a brush for embracing the crown of a carcass, a trough above the brush having an open front communicating with the brush, a valve for controlling the passage of cement from the reservoir to the trough, and stops on the trough at the ends of the brush adapted to abut the sides of the tire and coact with the trough in forming a hopper for the brush.

Signed at Detroit, county of Wayne, State of Michigan, this 25th day of November 1914.

JOHN M. HIBNER.

Witnesses:
JOHN CARLSON,
J. H. SWIFT.